US011930343B2

(12) United States Patent
Cheng et al.

(10) Patent No.: US 11,930,343 B2
(45) Date of Patent: Mar. 12, 2024

(54) SOUND PRODUCING UNIT, SOUND PRODUCING MODULE, AND ELECTRONIC TERMINAL

(71) Applicant: GOERTEK INC., Shandong (CN)

(72) Inventors: Hanlong Cheng, Shandong (CN); Chengfei Zhang, Shandong (CN); Chunfa Liu, Shandong (CN)

(73) Assignee: Goertek Inc., Shandong (CN)

( * ) Notice: Subject to any disclaimer, the term of this patent is extended or adjusted under 35 U.S.C. 154(b) by 553 days.

(21) Appl. No.: 17/050,985

(22) PCT Filed: Dec. 11, 2018

(86) PCT No.: PCT/CN2018/120394
§ 371 (c)(1),
(2) Date: Oct. 27, 2020

(87) PCT Pub. No.: WO2019/205661
PCT Pub. Date: Oct. 31, 2019

(65) Prior Publication Data
US 2021/0235196 A1 Jul. 29, 2021

(30) Foreign Application Priority Data
Apr. 27, 2018 (CN) ......................... 201810395906.6
Apr. 27, 2018 (CN) ......................... 201820623346.0

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/026* (2013.01); *H04R 3/00* (2013.01); *H04R 9/045* (2013.01)

(58) Field of Classification Search
None
See application file for complete search history.

(56) References Cited

U.S. PATENT DOCUMENTS 9,813,821 B1 * 11/2017 Song ...................... H04R 9/025
2006/0182304 A1 8/2006 Takase et al.
(Continued)

FOREIGN PATENT DOCUMENTS

CN 202799131 U 3/2013
CN 203761581 U 8/2014
(Continued)

*Primary Examiner* — Walter F Briney, III
(74) *Attorney, Agent, or Firm* — Baker Botts, LLP

(57) ABSTRACT

The present disclosure provides a sound generating unit, a sound generating module and electronic terminal, comprising a magnetic circuit system, a vibration system, and a circuit board. The voice coil is jointly wound by two voice coil wires, and the two end portions of each voice coil wire respectively form a wire-in end and a wire-out end; the lead-out positions of the two wire-in ends are located on one side of the voice coil, and the lead-out positions of the two wire-out ends are located on the other side of the voice coil; the two wire-in ends and the two wire-out ends are electrically connected to the corresponding pads of the circuit board respectively, and the internal circuit of the circuit board is configured to electrically connect the two wire-in ends together, and electrically connect the two wire-out ends together.

19 Claims, 3 Drawing Sheets

(51) Int. Cl.

| | |
|---|---|
| ***H04R 3/00*** | (2006.01) |
| ***H04R 9/04*** | (2006.01) |

(56) References Cited

U.S. PATENT DOCUMENTS

| | | | | |
|---|---|---|---|---|
| 2016/0007121 A1* | 1/2016 | Hung | ....................... | H04R 9/06<br>381/401 |
| 2018/0124520 A1* | 5/2018 | Schoeffmann | ........... | H04R 9/06 |

FOREIGN PATENT DOCUMENTS

| | | | | | |
|---|---|---|---|---|---|
| CN | 205545918 U | 8/2016 | | |
| CN | 206313983 U | 7/2017 | | |
| EP | 1 775 991 A1 | 4/2007 | | |
| KR | 20100121771 A * | 11/2010 | ............... | H04R 9/02 |

* cited by examiner

SOUND PRODUCING UNIT, SOUND PRODUCING MODULE, AND ELECTRONIC TERMINAL

CROSS-REFERENCE TO RELATED APPLICATION

This application is a National Stage of International Application No. PCT/CN2018/120394, filed on Dec. 11, 2018, which claims priority to Chinese Patent Application No. 201810395906.6, filed on Apr. 27, 2018, and Chinese Patent Application No. 201820623346.0, filed on Apr. 27, 2018, all of which are hereby incorporated by reference in its entirety.

TECHNICAL FIELD

The present invention relates to the field of electro-acoustic conversion, and more specifically, the present invention relates to a sound generating unit; the present invention also relates to a sound generating module and an electronic terminal using such sound generating unit.

BACKGROUND

A loudspeaker is an important acoustic component in the electronic devices, and is a transducer device that converts an electrical signal into an acoustic signal. Existing loudspeaker module includes a casing, and a magnetic circuit system and a vibration system both arranged in the casing. The magnetic circuit system of the loudspeaker may adopt a single magnetic circuit structure, a dual magnetic circuit structure, a three magnetic circuit structure, or other structures well known to those skilled in the art.

A traditional voice coil is made by winding a voice coil wire, and for example, the voice coil wire may be wound on a voice coil skeleton to form the voice coil. The voice coil wire forms a wire-in end and a wire-out end on the voice coil skeleton, and the wire-in end and the wire-out end electrically connect the voice coil to an external circuit to feed an audio signal to the voice coil through the external circuit. The voice coil in this structure forms a conductive loop through the wire-in end and the wire-out end, which makes internal resistance of the voice coil relatively large.

In order to reduce the internal resistance, it is necessary to reduce the number of winding turns and/or the number of layers of the voice coil wire on the voice coil skeleton, but this will reduce the BL value of the sound generating device, resulting in poor vibration characteristics of the vibration system. If increasing the BL value, the only way is to increase the number of turns and/or layers of the voice coil wire on the voice coil skeleton, but this will increase the internal resistance of the voice coil and leads to a poor vibration characteristics of the vibration system, and make the performance of the sound generating device not meet a demand.

Summary

An object of the present invention is to provide a new technical solution for a sound generating unit.

According to the first aspect, a sound generating unit is provided, comprising a magnetic circuit system, a vibration system, and a circuit board, wherein the magnetic circuit system comprises a magnetic yoke, and a central magnetic circuit portion and a side magnetic circuit portion both arranged on the magnetic yoke, and at least one of the central magnetic circuit portion and the side magnetic circuit portion comprises a permanent magnet, and the central magnetic circuit portion and the side magnetic circuit portion form a magnetic gap therebetween; the vibration system comprises a diaphragm and a voice coil, and the voice coil is connected with one end thereof to the diaphragm and extends with the other end thereof into the magnetic gap of the magnetic circuit system;

wherein, the voice coil is formed of two voice coil wires wound together, and each voice coil wire respectively forms with two end portions thereof a wire-in end and a wire-out end; the voice coil has on one side thereof lead-out positions of two wire-in ends, and the voice coil has on the other side thereof lead-out positions of two wire-out ends; the two wire-in ends and the two wire-out ends are respectively electrically connected to corresponding pads of the circuit board, and the circuit board has an internal circuit configured to electrically connect the two wire-in ends together and to electrically connect the two wire-out ends together.

Optionally, the wire-in end is symmetrical to an adjacent wire-out end with respect to a first axis of the Voice coil.

Optionally, the two wire-in ends are symmetrical with respect to as second axis of the voice coil, and the two wire-out ends are symmetrical with respect to the second axis of the voice coil, and the first axis of the voice coil is perpendicular to the second axis of the voice coil.

Optionally, the wire-in end and an adjacent wire-out end are two end portions of the same voice coil wire.

Optionally, the wire-in end and an adjacent wire-out end are respectively one end portion of the two voice coil wires.

Optionally, the side magnetic circuit portion forms respectively an opening at a position corresponding to the two wire-in ends and an opening at a position corresponding to the two wire-out ends, and the circuit board forms pads at positions respectively corresponding to the openings of the side magnetic circuit portion, and the two wire-in ends and the two wire-out ends pass through the respective openings and are welded on adjacent pads.

Optionally, the two wire-in ends and the two wire-out ends are led out in an S-shape at positions of their respective openings.

Optionally, the side magnetic circuit portion forms respectively an opening at a position corresponding to the two wire-in ends and an opening at a position corresponding to the two wire-out ends, and the circuit board forms pads at positions respectively corresponding to the openings of the side magnetic circuit portion, and the two wire-in ends and the two wire-out ends respectively pass through their respective corresponding openings, wind to an outside the corresponding side magnetic circuit portion, circuitously extend to the corresponding adjacent pad from the outside the corresponding side magnetic circuit portion, and are welded on the adjacent pads, and the two wire-in ends and the two wire-out ends are respectively welded on different pads.

Optionally, when the two wire-in ends respectively pass through their respective corresponding openings, at least one wire-in end and the corresponding side magnetic circuit portion therebetween have a distance gradually decreasing in a direction from being close to the magnetic gap to being close to outside the side magnetic circuit portion;

and/or, when the two wire-out ends respectively pass through their respective corresponding openings, at least one wire-out end and the corresponding side magnetic circuit portion therebetween have as distance gradually decreasing in the direction from being close to the magnetic gap to being close to the outside the side magnetic circuit portion.

Optionally, the adjacent pad welded to each wire-in end is a pad formed at the opening of the other wire-in end; and the adjacent pad welded to each wire-out end is a pad formed at the opening of the other wire-out end.

Optionally, the side magnetic circuit portion is formed with a carrying platform facing the magnetic yoke at outer side of a partial edge of the side magnetic circuit portion;

at least one of the two wire-in ends and the two wire-out ends has a first part fixed on the carrying platform; the first part is a part of the wire-in ends and the wire-out ends wound to the outside the corresponding side magnetic circuit portion.

Optionally, the side magnetic circuit portion comprises a side magnet and a side concentrating flux plate disposed on an upper surface of the side magnet;

the side magnet has an outer edge extending outward to form the carrying platform;

or, the side concentrating flux plate has an outer edge bent in a direction toward the magnetic yoke and extending to the outer side of the side magnet to form the carrying platform.

Optionally, the outer side of the partial edge of the side magnetic circuit portion is provided with a fixing member, and the fixing member comprises a first component facing the diaphragm and a second component facing the magnetic yoke, and the first component and the second component are facing each other with a Clearance there between;

at least one of the two wire-in ends and the two wire-out ends, when being wound to the outside of the corresponding side magnetic circuit portion, is sandwiched in the clearance and passes through the clearance to be electrically connected to the corresponding adjacent pad.

Optionally, the fixing member is an elastic member.

Optionally, the side magnetic circuit portion is formed with an accommodating groove at a side away from the magnetic gap, and the circuit board is of a hollow ring shape and is arranged in the accommodating groove.

Optionally, the side magnetic circuit portion comprises a side magnet and a side concentrating flux plate disposed on an upper surface of the side magnet;

the side concentrating flux plate is formed with a recessed portion at a side facing the side magnet, and the recessed portion is located on an edge at a side of the side concentrating flux plate away from the magnetic gap, and the recessed portion constitutes the accommodating groove;

or, the side magnet is formed with a recessed portion on a side facing the side concentrating flux plate, and the recessed portion is located on an edge at a side of the side magnet away from the magnetic gap, and the recessed portion constitutes the accommodating groove;

or, the side concentrating flux plate and the side magnet are formed with recessed portions at their sides facing, each other, and the recessed portions are located on edges at the sides of the side concentrating flux plate and the side magnet away from the magnetic gap, and the recessed portions of the side concentrating flux plate and the side magnet together constitute the accommodating groove.

Optionally, the diaphragm is fixed above the side magnetic circuit portion with the edge thereof;

the diaphragm has a projection in its vibration direction which is located within an outer contour range of the magnetic circuit system.

Optionally, the side magnetic circuit portion comprises a side magnet and a side concentrating flux plate disposed on an upper surface of the side magnet, and the edge of the diaphragm is fixed on an upper surface of the side concentrating flux plate.

Optionally, the edge of the upper surface of the side concentrating flux plate is provided with a washer, and the edge of the diaphragm is fixed on the washer.

Optionally, the edge of the side concentrating flux plate is provided with a flange protruding upward therefrom, and the edge of the diaphragm is fixed on the flange.

Optionally, a flange protrudes upward from the edge of the side concentrating flux plate, and the edge of the diaphragm is fixed on the flange.

According to the second aspect, a sound generating module is provided, comprising a module housing and a sound generating unit installed in the module housing.

According to the third aspect, an electronic terminal is provided, comprising a terminal housing, and a sound generating unit installed in the terminal housing, or a sound generating module installed in the terminal housing.

In the voice coil of the present invention, winding of the voice coil is in the way of two voice coil wires co-winding, and the two voice coil wires are connected in parallel such that two leading wires in parallel may be thinner than a single wire under the premise of the same resistance, thereby the thickness of the voice coil being thinner, the magnetic gap being narrower, having a higher BL value, and then improving the sensitivity of the vibration system and improving the sound performance of the sound generating unit.

Furthermore, the winding of the voice coil is in the way of two voice coil wires co-winding, wherein two lead-in wires and two lead-out wires form four suspended leading wires. The four suspended leading wires are geometrically symmetrically, and have more symmetrical reaction force to the vibration system during vibration, thereby greatly reducing the polarization of the product, improving distortion and sound quality. In addition, this design enables the sound generating unit to have a higher BL value, thereby improving the sensitivity of the unit.

Other features and advantages of the invention will become clear from the following detailed description of exemplary embodiments of the invention with reference to the drawings.

BRIEF DESCRIPTION OF THE DRAWINGS

The drawings incorporated in the specification and constituting a part of the specification illustrate embodiments of the present invention, and together with the description thereof, serve to explain the principle of the present invention.

DETAILED DESCRIPTION

Figure 1:
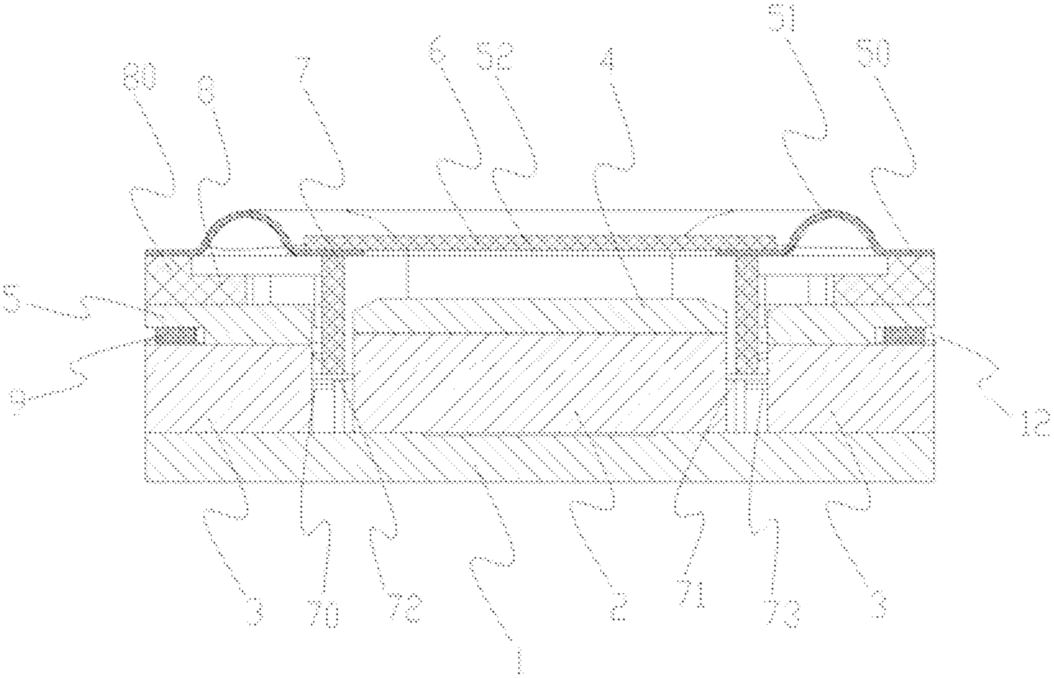
FIG. 1 is a cross-sectional view of the sound generating unit of the present invention.

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

Referring to FIG. 1, the present invention provides a sound generating unit, which may be applied to a sound generating module and an electronic terminal. The sound generating unit of the present invention includes a magnetic circuit system and a vibration system. The magnetic circuit system may adopt a single magnetic circuit structure, a dual magnetic circuit structure or a multi-magnetic circuit structure well known to those skilled in the art. For example, in a specific embodiment of the present invention, the magnetic circuit system includes a magnetic yoke 1 and a central magnetic circuit portion and a side magnetic circuit portion arranged on the magnetic yoke 1. At least one of the central magnetic circuit portion and the side magnetic circuit portion includes a permanent magnet, and a magnetic gap is formed between the central magnetic circuit portion and the side magnetic circuit portion.

For example, the side magnetic circuit portion may be integrally formed with the magnetic yoke 1, and is formed on the side wall of the edge of the magnetic yoke 1. The central magnetic circuit portion may be a permanent magnet arranged in the central area of the magnetic yoke 1 and forms the magnetic gap of the magnetic circuit system with the sidewall of the magnetic yoke 1.

Figure 2:
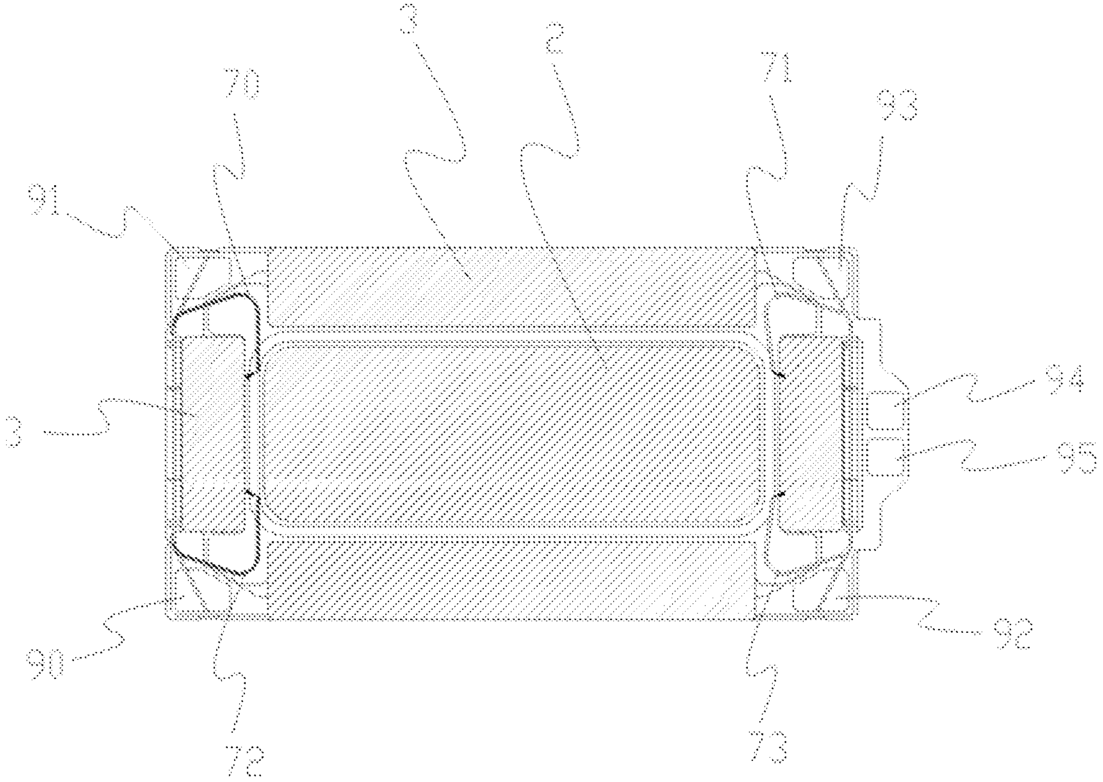
FIG. 2 is a bottom view of the sound generating unit shown in FIG. 1 with a magnetic yoke removed.

Alternatively, the magnetic yoke 1 may be in a flat plate structure or a pot-like structure, the central magnetic circuit portion includes a central magnet 2 installed in the central area of the magnetic yoke 1, and the side magnetic circuit portion includes side magnets 3 distributed on the side of the central magnet 2. Two side magnets 3 may be provided. Of course, four side magnets 3 can also be provided, are distributed around the central magnet 2, and form a magietic gap of the magnetic circuit system with the central magnet 2 therebetween. Referring to FIG. 2, the four side magnets 3 enclose an approximately rectangular structure, and an opening is formed between two adjacent side magnets 3 to facilitate the subsequent leading out of the voice coil wires.

In order to allow magnetic lines of the magnetic circuit system to gather near the magnetic gap, a central concentrating flux plate 4 may be provided on an upper surface of the central magnet 2, and for example may be fixed to the central magnet 2 by bonding. Upper surfaces of the side magnets 3 may be provided with side concentrating flux plates 5, wherein four side concentrating flux plates 5 may be provided, and may be fixed to the four side magnets 3 by bonding respectively. It is also possible that the side concentrating flux plates 5 adopt an integral ring structure and are bonded to the upper surfaces of the four side magnets 3 at the same time.

The vibration system of the present invention includes a diaphragm and a voice coil 7 mounted on the diaphragm. The diaphragm of the present invention includes a connecting portion 50 located at the edge, a vibrating portion 52 located in the middle, and a corrugated rim 51 located between the connecting portion 50 and the vibrating portion 52. The connecting portion 50 at the edge of the diaphragm may be supported above the side concentrating flux plate 5 by a washer 8, and of course, the washer 8 can also be provided on the magnetic yoke 1. Of course, the diaphragm can also be a flat diaphragm, which belongs to the common knowledge for those skilled in the art and will not be described in detail here.

The diaphragm is connected to the washer 8 by the connecting portion 50 at its edge. The vibrating portion 52 in the middle area is the main sound generating area of the diaphragm. The vibrating portion 52 may be driven to produce sound by the voice coil 7, and the corrugated rim 51 can increase sensitivity of the vibrating portion 52.

The upper end of the voice coil 7 of the present invention may be directly connected to the lower end of the vibrating portion 52. It is also possible that a hollowed-out structure is provided on the vibrating portion 52, and is covered by the dome structure 6 provided. As such, the upper end of the voice coil 7 may be connected to the area of the vibrating portion 52 where is not hollowed out, or directly connected to the lower end of the dome structure 6. The other end of the voice coil 7 needs to extend into the magnetic gap of the magnetic circuit system, so that the voice coil 7 vibrates under the action of the magnetic field line.

The voice coil 7 is formed by co-winding two voice coil wires, that is, the voice coil 7 of the present invention is formed by winding two voice coil wires. The voice coil wire may be an enameled wire well known to those skilled in the art. The two voice coil wires are arranged side by side, and may be wound layer by layer at the same time by a winding machine, so that the two voice coil wires are arranged at intervals on the winding wire of each layer. The number of layers wound on the voice coil 7 may be determined according to design requirements, for example, two or more layers.

When each voice coil wire is wound to form the voice coil 7, the two ends respectively form a wire-in end and a wire-out end, wherein the wire-in end is used for lead in of an electrical signal, and the wire-out end is used for lead out of the electrical signal, to form a loop.

The two wire-in ends and the two wire-out ends need to be led out from the voice coil 7 respectively, that is, the voice coil 7 has four lead ends which are led out from four different positions of the voice coil 7, which makes it possible to design the four lead ends into a balanced symmetrical structure to solve the polarization problem of the vibration system.

In this way, winding of the voice coil is in the way of two voice coil wires co-winding, and the two voice coil wires are connected in parallel, such that two leading wires in parallel may be thinner than a single wire under the premise of the same resistance, thereby the thickness of the voice coil being thinner, the magnetic gap being narrower, having a higher BL value, and then improving the sensitivity of the vibration system and improving the sound performance of the sound generating unit.

For ease of description, the two wire-in ends and the two wire-out ends may be marked as a first wire-in end 70, a second wire-in end 72, a first wire-out end 71, and a second wire-out end 73, respectively. The first wire-in end 70 and the second wire-in end 72 have lead-out positions located at two end areas of one side of the voice coil 7, and the first wire-out end 71 and the second wire-out end 73 have lead-out positions located at two end areas of the other side of the voice coil 7.

It should be noted that one side of the voice coil where the lead-out positions of the wire-in ends are located is opposite to the other side of the voice coil where the lead-out positions of the wire-out ends are located. For example, the lead-out position of the wire-in end is on the left side of the voice coil, and then the lead-out position of the wire-out end is on the right side of the voice coil. Or, the lead-out position of the wire-in end is on the upper side of the voice coil, and then the lead-out position of the wire-out end is on the lower side of the voice coil.

With reference to the view orientation of FIG. 2, the lead-out positions of the first wire-in end 70 and the second wire-in end 72 are located at the upper end and lower end areas of the left side of the voice coil 7, and the lead-out positions of the first wire-out end 71 and the second wire-out end 73 are located at the upper and lower end areas of the right side of the voice coil 7. It should be noted that the "left side" and "right side" here do not refer to the left and right side walls of the voice coil 7, but refer to the left and right regions of the voice coil 7.

The first wire-in end 70, the second wire-in end 72, the first wire-out end 71, and the second wire-out end 73 may be led out from four corner positions of the voice coil 7 for example, and may be led out from short sides of the four corner areas of the voice coil 7, or may be led out from the long sides of the four corner areas, which are not specifically limited here.

The lead-out positions of the first wire-in end 70, the second wire-in end 72, the first wire-out end 71, and the second wire-out end 73 are located at the four corners of the voice coil 7. The first wire-in end 70 and the second wire-in end 72 are adjacent to each other at one short side of the voice coil 7, and the first outlet end 71 and the second outlet end 73 are adjacent to each other at the other short side of the voice coil 7. The first wire-in end 70 and the first wire-out end 71 are adjacent to each other at one long side of the voice coil 7, and the second wire-in end 72 and the second wire-out end 73 are adjacent to each other at the other long side of the voice coil 7.

The two adjacent side magnets 3 therebetween form openings correspond to the four corner areas of the voice coil 7, so that the four lead ends may be led out from the corresponding opening positions and connected to corresponding pads of a circuit board.

As such, the winding of the voice coil is in the way of two voice coil wires co-winding, wherein two lead-in wires and two lead-out wires form four suspended leading wires. The four suspended leading wires are geometrically symmetrically, and have more symmetrical reaction force to the vibration system during vibration, thereby greatly reducing the polarization of the product, improving distortion and sound quality. In addition, this design enables the sound generating unit to have a higher BL value, thereby improving the sensitivity of the unit.

In a specific embodiment of the present invention, the circuit board may be an FPCB board 9, refer to FIG. 1. The FPCB board 9 may be adhered to a washer 8 (or a support housing), or may be adhered to the side concentrating flux plate 5 or the side magnet 3, which is not limited here.

In a specific embodiment of the present invention, an accommodating groove 12 is formed on a side of the side magnetic circuit portion away from the magnetic gap. Referring to FIG. 1, the area close to the peripheral edge of the side magnetic circuit portion is pressed to form a recessed accommodating groove 12 which extends around the periphery of the magnetic circuit system in a circle. The circuit board 9 being of a hollow ring shape is arranged in the accommodating groove 12.

Such a structure prevents the overall shape of the sound generating unit from becoming thicker or wider due to the installation of the circuit board. Refer to FIG. 1; the circuit board is completely buried in the magnetic circuit system. The sound generating unit provided by the present invention makes the overall structure more compact by designing the accommodating groove, and reduces the space occupied by it as much as possible without compromising product performance.

In particular, by designing an accommodating groove on the periphery of the side magnetic circuit portion, it can also play a role in gathering magnetic induction lines and increasing the intensity of the magnetic field in the magnetic gap. The accommodating groove 12 located on the periphery of the side magnetic circuit portion occupies a part of the space of the magnetic circuit system, that is, the magnetic circuit system forms the hollowed-out portion on a part of the periphery. The hollowed-out portion on the magnetic circuit system cannot conduct magnetism. On the contrary, when the magnetic circuit system has a certain magnetism, the magnetic induction lines will gather to a side of the side magnetic circuit portion close to the magnetic gap, and pass through the magnetic circuit system inside the accommodating groove 12. In this way, the magnetic field strength inside the magnetic circuit system is improved, which can effectively increase the magnetic field strength at the magnetic gap in the magnetic circuit system. For the acoustic performance of the sound generating unit, the response sensitivity is improved, and the acoustic performance is significantly improved.

In a specific embodiment of the present invention, a surface at a side of the side concentrating flux plate 5 facing the side magnet 3 is formed with a recessed portion. After the side concentrating flux plate 5 is attached to the side magnet 3, the recessed portion constitutes said accommodating groove 12. The recessed portion on the side concentrating flux plate 5 is preferably close to the outer edge of the side concentrating flux plate 5, that is, the recessed portion is located at a side of the side concentrating flux plate 5 away from the central magnetic circuit portion and the magnetic gap, so that the magnetic induction lines gather to a side close to the central magnetic circuit portion.

In other optional similar embodiments, the recessed portion may also be formed on a surface at the side of the side magnet 3 facing the side concentrating flux plate 5. After the side concentrating flux plate 5 is covered with the side magnet 3, the recessed portion constitutes the aforementioned accommodating groove 12. The recessed portion is preferably located at a side of the side magnet 3 away from the central magnetic circuit portion and the magnetic gap, so that the magnetic induction lines gather to a side close to the central magnetic circuit portion.

In other optional similar embodiments, the side magnets 3 and the side concentrating flux plate 5 are formed with recessed portions at their sides facing to each other, and the recessed portions of them are positioned corresponding to each other and together constitute the aforementioned accommodating groove 12. The recessed portions are preferably located on a side of the side magnet 3 and the side concentrating flux plate 5 away from the central magnetic circuit portion and the magnetic gap, so that the magnetic induction lines gather to a side close to the central magnetic circuit portion.

The FPCB board 9 forms pads at the corresponding opening positions, for example, which may be recorded as a first pad 91 distributed adjacent to the first wire-in end 70, a second pad 93 distributed adjacent to the first wire-out end 71, a third pad 90 distributed adjacent to the second wire-in end 72, and a fourth pad 92 distributed adjacent to the second wire-out end 73.

Two wire-in ends and two wire-out ends are respectively welded on different pads. For example, the first wire-in end 70, after being led out from the corner position of the voice coil 7, passes through the opening formed between the two adjacent side magnets 3 corresponding to the first wire-in end 70 and winds to the outside the corresponding side magnet 3, and circuitously extends from the outside the side magnet 3 to the third pad 90 distributed adjacent to the second wire-in end 72. Correspondingly, the second wire-in end 72, after being led out from the corner position of the voice coil 7, passes through the opening formed between the two adjacent side magnets 3 corresponding to the second wire-in end 72 and winds to the outside the corresponding side magnet 3, and circuitously extends from the outside the side magnet 3 to the first pad 91 distributed adjacent to the first wire-in end 70. The first wire-out end 71 and the second wire-out end 73 are also led out in this manner, and will not be described in detail here.

As shown in the structure shown in FIG. 2, the two wire-in ends and the two wire-out ends circuitously extend along the outside the side magnet 3 at the short side after passing through their corresponding openings, so that the adjacent pad welded to each wire-in end is a pad formed at the opening of the other wire-in end; and the adjacent pad welded to each wire-out end is a pad formed at the opening of the other wire-out end.

For those skilled in the art, the two wire-in ends and the two wire-out ends can also circuitously extend along the outside the side magnet 3 at the long side after passing through their corresponding openings, which will not be described in detail here.

In an optional embodiment of the present invention, when the two wire-in ends respectively pass through their respective corresponding openings, a distance between at least one wire-in end and the corresponding side magnetic circuit portion gradually decreases from a portion close to the magnetic gap to a portion close to the outside the side magnetic circuit portion; and/or when the two wire-out ends respectively pass through their respective corresponding openings, a distance between at least one wire-out end and the corresponding side magnetic circuit portion gradually decreases from a portion close to the magnetic gap to a portion close to the outside the side magnetic circuit portion.

Specifically, referring to FIG. 2, when the first wire-in end 70 passes through the opening formed between the two adjacent side magnets 3 corresponding to it after being led out from the corner position of the voice coil 7, a distance between the first wire-in end 70 and the side magnet 3 at the short side gradually decreases in a direction from being close to the magnetic gap to being close to the outside the corresponding side magnet 3. The second wire-in end 72, the first wire-out end 71, and the second wire-out end 73 are also led out in this manner, and will not be described in detail here. By adopting such a lead-out manner, the suspended length of the four lead-out ends may be increased in a small space, thereby reducing the stress of the leading wire during vibration and improving the vibration effect of the vibration system.

In an optional embodiment of the present invention, a carrying platform 10 facing the magnetic yoke 1 is formed on the outside a partial edge of the side magnetic circuit portion, and a carrying surface thereof facing the magnetic yoke 1 is used for carrying and fixedly connecting the leading wires extending thereto or extending therefrom. In the present invention, the outside the partial edge of the side magnetic circuit portion refers to a side of the side magnetic circuit portion away from the central magnetic circuit portion and the magnetic gap, or a side of the side magnetic circuit portion located at the outer surface of the sound generating unit.

Figure 4:
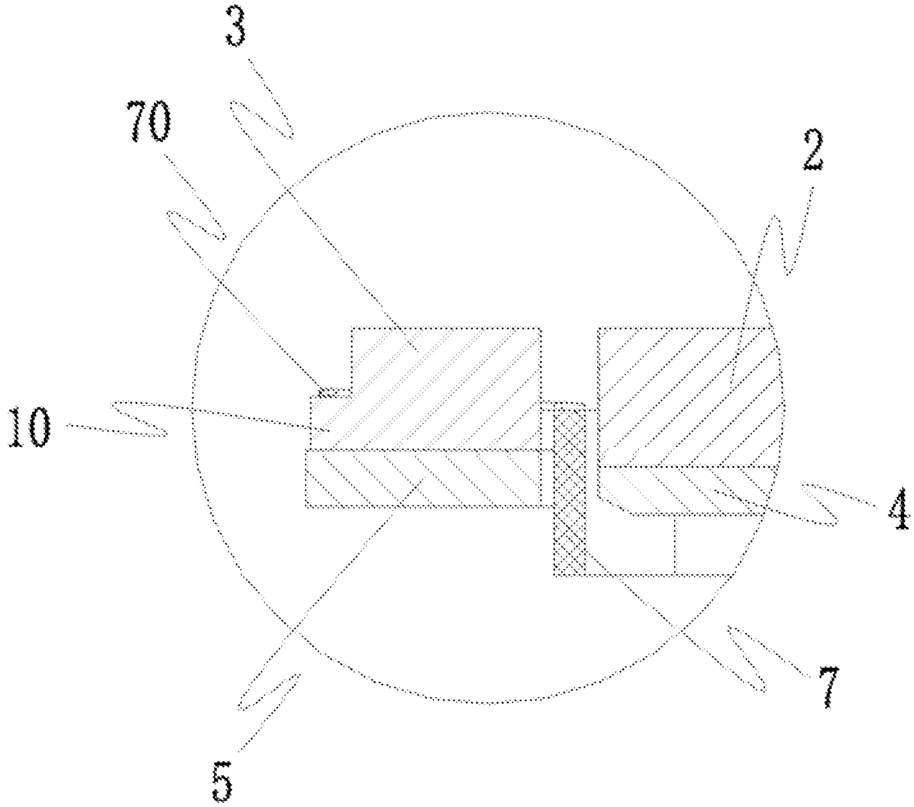
FIG. 4 is a partial enlarged view of a first embodiment of a side magnetic circuit portion of the sound generating unit.

Specifically, referring to FIG. 4, an outer edge of the side magnet 3 extends outward to form a backing platform, which is placed on a side of a side magnet body away from the magnetic gap and constitutes the carrying platform 10. The form of forming the backing platform on the side magnet 3 is not limited by the present invention. With reference to the view orientation of FIG. 4, preferably, a top surface of the backing platform is lower than that of the side magnet body, so that the backing platform can more accurately position the leading wires. The side magnetic circuit portion may include two or four side magnets 3 in total, wherein the carrying platform may be formed only on the periphery of the two side magnets 3. The present invention does not limit how many side magnets the side magnetic circuit portion specifically includes, and which side magnets have a carrying platform formed on the periphery. In specific implementation, it may be configured specifically according to the performance and shape requirements of the sound generating unit, in the embodiments shown in FIGS. 2 and 4, a carrying platform 10 is formed on an outer side of the side magnets 3 at two short sides symmetrically distributed.

Figure 5:
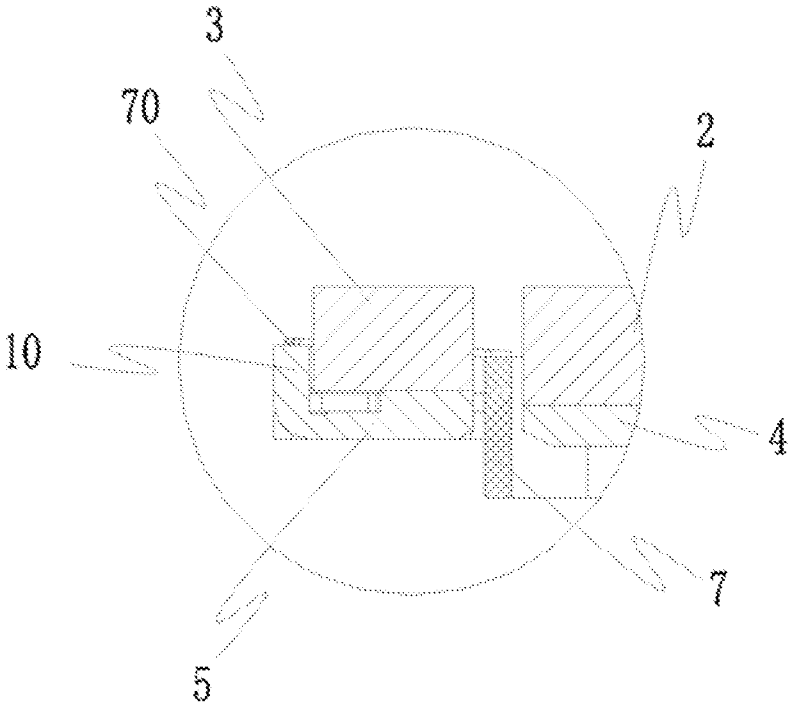
FIG. 5 is a partial enlarged view of a second embodiment of the side magnetic circuit portion of the sound generating unit.

In another embodiment, referring to FIG. 5, the side concentrating flux plate 5 has a flanged edge that is bent and extends to the outside the side magnet 3, and the flanged edge extends to enclose the outer surface of the side macnet 12 and constitutes the aforementioned carrying platform 10.

The advantages of the above two embodiments are that, on the one hand, the structural feature of forming the carrying platform by the side magnet or the side concentrating flux plate is simple, the processing and assembly processes are simple, and the production cost of the sound generating unit will not increase significantly. On the other hand, the side magnet or the side concentrating flux plate is located at the outermost periphery of the entire magnetic circuit system, and the outer side thereof is formed with a carrying platform, which can maximize the extension length of the leading wire and reduce the breakage risk of leading wires but will not significantly affect overall structural shape and space occupation of the sound generating unit. Further, both the side magnet and the side concentrating flux plate are the stable components fixed in the sound generating device unit, and the leading wires extend to the carrying platform thereon for fixing, which has a higher stability and is less prone to shaking and the like.

The present invention does not limit the need to form a carrying platform on the side magnet or the side concentrating flux plate. In other embodiments, for example, the side magnetic circuit portion is composed of ring-shaped magnetic conductive component, or the side magnetic circuit portion is composed of magnetically conductive sidewall component, and the above-mentioned carrying platform may also be formed on the peripheral surface of these structures.

During the first wire-in end 70 circuitously extends from the outer side of the side magnet 3 to the third pad 90, a part (may be recorded as a first part) of the first wire-in end 70 wound to the outer side of the side magnet 3 may be fixed on the carrying platform 10, for example, by bonding or welding.

The first wire-out end 71, the second wire-in end 72, and the second wire-out end 73 can also be led out in this manner, and the detailed description is omitted here.

With such a structure, the leading wires are more stably fixed in the sound generating unit, and are not prone to leading wires breakage, detachment from the pads and misalignment due to voice coil vibration, which significantly improves the stability of the leading wires. On the other hand, since the leading wires are led out from the voice coil and then wound around the periphery of the side magnetic circuit portion, it leads to a longer traveled extension distance and a larger amount of elastic deformation. As such, the leading wires cause a relatively reduced pulling force on the voice coil, and accordingly are not easily broken when the voice coil is vibrating. The sound generating unit has higher application reliability.

In another embodiment of the present invention, a fixing member 11 is provided outside a partial edge of the side magnetic circuit portion, and is used for carrying and fixedly connecting the leading wires extending thereto or extending therefrom. In the present invention, the outside a partial edge of the side magnetic circuit portion refers to a side of the side magnetic circuit portion away from the central magnetic circuit portion and the magnetic gap, or a side of the side magnetic circuit portion located at the outer surface of the sound generating unit.

The fixing member 11 is configured to be able to limit the height positions of the leading wires in the sound generating unit from the upper and lower sides of the leading wires at least along the up and down vibration direction of the diaphragm; that is, in the height direction of the sound generating unit, the positions of the leading wires are limited from the upper and lower sides. It can avoid the phenomenon that the segments of the leading wires fixed in the sound generating unit float up and down and collide with the vibration of the diaphragm.

Figure 6:
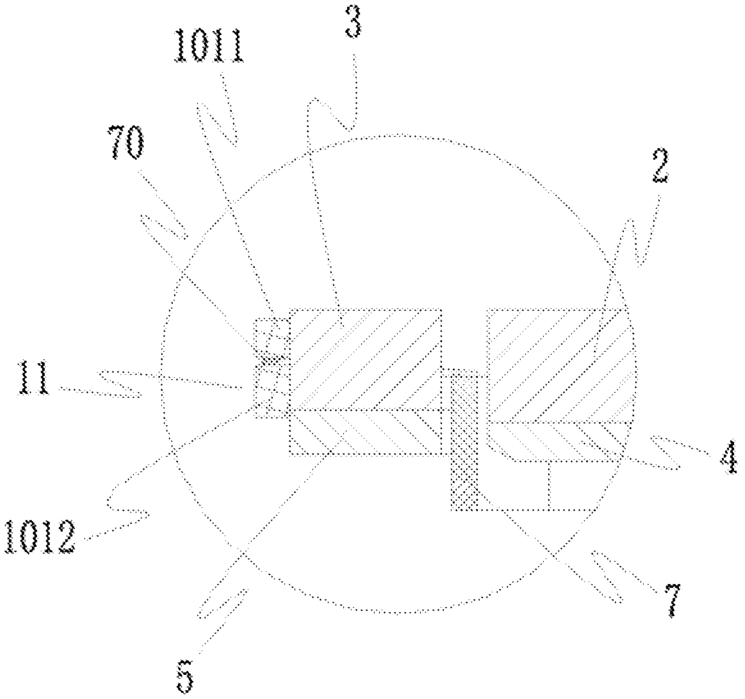
FIG. 6 is a partial enlarged view of a third embodiment of the side magnetic circuit portion of the sound generating unit.

Referring to FIG. 6, the first wire-in end 70 is wound to the periphery of the side magnetic circuit portion, and extends to the fixing member 11 located on the periphery of the side magnetic circuit portion, and then forms an electrical connection with the third pad 90. The first wire-in end 70 may be fixedly connected to the fixing member 11 by bonding, welding, or the like. The fixing member 11 has clearance, perforation or other structures, so that the first wire-in end 70 can pass through the fixing member 11. The fixing member 11 clamps and fixes the first wire-in end 70 through clearance or fixes the first wire-in end 70 through the radial restriction of perforation. At least the fixing member 11 can play the role of restricting positions from the upper and lower sides of the first wire-in end 70.

The first wire-out end 71, the second wire-in end 72, and the second wire-out end 73 can also be led out in this manner, which will not be described in detail here.

The technical solution proposed by the present invention provides a leading wire fixing member that plays the functions of the fixed connection and restricting the position for the segment of leading wires leading out from the voice coil to the electrical connection with the pads. Compared with the prior art, the leading wires are more stably fixedly connected in the sound generating device unit, and the heights thereof are effectively restricted by the radial limit effect imposed by the leading wire fixing member on part of the segment of the leading wires. Furthermore, the leading wires are not easy to get into troubles such as wires breakage, undulation, separation from the pad, or misalignment of the leading wires due to voice coil vibration, which significantly improves the stability of the leading wires.

On the other hand, since the leading wires are led out from the voice coil and then wound around the periphery of the side magnetic circuit portion, it leads to a longer traveled extension distance and a larger amount of elastic deformation. As such, the leading wires cause a relatively reduced pulling force on the voice coil, and accordingly are not easily broken when the voice coil is vibrating. The sound generating unit has higher application reliability.

Specifically, as shown in FIG. 6, an independent fixing member 11 is directly arranged on the periphery of the side magnet 3 and the side concentrating flux plates. The fixing member 11 may be attached or adhered to the outer surface of the side magnet 3 and the side concentrating flux plate 5, or fixed on the side magnet and the side concentrating flux plate by injection molding, and the specific connection manner is not limited by the present invention. The fixing member 11 may be divided into a first component 1011 facing the diaphragm and a second component 1012 facing the magnetic yoke. The first component 1011 and the second component 1012 may be independent of each other or connected to each other, which is limited in the present invention. The first component 1011 and the second component 1012 are arranged facing each other with a clearance there between.

The first component 1011 and the second component 1012 shown in FIG. 6 are independent of each other and are not connected to each other. For the embodiment in which the fixing member 11 adopts a perforation to accommodate the leading wires, the first component 1011 and the second component 1012 may be an integral structure, and the clearance between the first and second components is the perforation for the fixing member 11. The fixing member 11 is entirely attached to the outer surface of the side magnetic circuit portion.

When the first wire-in end 70 is wound to the outside the corresponding side magnetic circuit portion, it is sandwiched in the clearance of the fixing member, and passes through the clearance to be electrically connected to the corresponding pad.

Preferably, the fixing member 11 may be an elastic member. When the leading wires are dragged by the voice coil and tend to move relatively, the elastic fixing member 11 can absorb the vibration of the leading wires through elastic deformation, thereby protecting the leading wires. Further, the contact between the elastic member and the leading wires is a flexible contact, therefore avoiding rigid collision, friction and other phenomena between the leading wire fixing member and the leading wires, and further reducing the problems of leading wire damage and brake. Optionally, the leading wire fixing member may be made of foam, elastic rubber and other materials, and then fixedly connected to the side magnetic circuit portion by means of adhesive bonding or injection molding connection.

Figure 3:
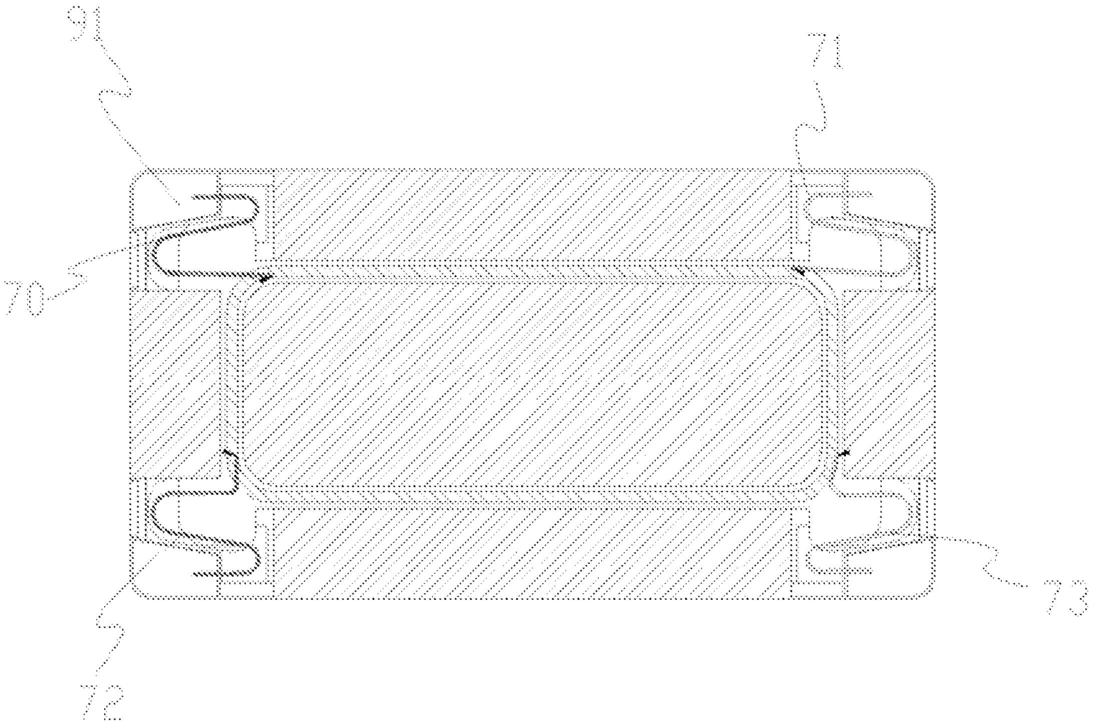
FIG. 3 is a bottom view of another embodiment with a magnetic yoke removed.

In another embodiment of the present invention, referring to FIG. 3, two wire-in ends and two wire-out ends pass through respective openings and are welded to the adjacent pads. That is to say, the first wire-in end 70, after being led out from the corner position of the voice coil 7, passes through the opening formed between the two adjacent side magnets 3 corresponding to it and is connected to the first pad 91 distributed adjacent to the first wire-in end 70; the second wire-in end 72, after being led out from the corner position of the voice coil 7, passes through the opening formed between the two adjacent side magnets 3 corresponding to it and is connected to the third pad 90 distributed adjacent to the second wire-in end 72. The first wire-out end 71 and the second wire-out end 73 are also led out in this manner, which will not be described in detail here.

Optionally, in this embodiment, the two wire-in ends and the two wire-out ends are led out in an S-shape at their respective opening positions. It is also possible to increase the suspended length of the four lead-out ends in a small space, and thus reduce the stress of the leading wires when vibrating and improve the vibration effect of the vibration system.

The FPCB board 9 of the present invention electrically connects the two wire-in ends together and electrically connects the two wire-out ends together through its internal circuit. Referring to FIG. 2, the FPCB board 9 is provided with a wire-in pad 94 and a wire-out pad 95 which are used for external circuits. The FPCB board 9 connects both the first pad 91 and the third pad 90 to the wire-in pad 94 through its internal circuit, and connects both the second pad 93 and the fourth pad 92 to the wire-out pad 95 through its internal circuit. This makes it possible to connect two voice coil wires in parallel, thereby reducing the internal resistance of the entire voice coil 7. From another perspective, compared with a traditional structure, under the premise of the same internal resistance, the voice coil 7 of the present invention may be wound with more voice coil wires, thereby improving the sensitivity of the vibration system and improving the sound performance of the sound generating unit.

In order to suppress the polarization problem of the vibration system, the four lead-out ends may be arranged in a symmetrical structure. For example, in a specific embodiment of the present invention, the wire-in end and an adjacent wire-out end are symmetrical with respect to the first axis of the voice coil 7. The first axis may be, for example, a central axis extending along the short side of the voice coil 7. With reference to the view orientations of FIGS. 1 and 2, the first wire-in end 70 and the first wire-out end 71 are adjacent to each other at the long side of the voice coil 7, and the first wire-in end 70 and the first wire-out end 71 are symmetrically distributed on the left and right sides of voice coil 7. Based on the same principle, the second wire-in end 72 and the second wire-out end 73 are adjacent to each other at the other long side of the voice coil 7, and are symmetrically distributed on the left and right sides of the voice coil 7. Through this symmetrical structural design, the stress generated by each lead-out end during vibration is also symmetrical, so that the polarization of the entire vibration system may be suppressed.

It should be pointed out that the "symmetry" here not only refers to the symmetrical lead-out position from the voice coil 7, but also refers to the symmetrical shape of the lead-out end along a line.

It is further preferred in the present invention that the two wire-in ends are symmetrical with respect to the second axis of the voice coil 7, the two wire-out ends are symmetrical with respect to the second axis of the voice coil 7, and the second axis and the first axis are different axes. For example, the first axis of the voice coil 7 is perpendicular to the second axis of the voice coil 7, that is, the second axis of the voice coil 7 may be a central axis extending along the long side of the voice coil 7. With reference to the view orientation of FIG. 1, the first wire-in end 70 and the second wire-in end 72 are symmetrically distributed on the upper and lower sides of the voice coil 7; and the first wire-out end 71 and the second wire-out end 73 are symmetrically distributed on the upper and lower sides of the voice coil 7. Thus, the first wire-in end 70 and the second wire-out end 73 are symmetrical with respect to the center of the voice coil 7.

The above symmetrical structure can minimize the polarization problem of the entire vibration system caused by the change of stress in the lead-out end during vibration. From one perspective, when this sound generating unit is applied to a specific product, since the polarization problem of the vibration system is suppressed, the maximum amplitude of the vibration system may be adjusted to increase so as to improve the user experience.

In the present invention, a wire-in end and an adjacent wire-out end may be two end portions of the same voice coil wire. That is to say, the first wire-in end 70 and the first wire-out end 71 may be two end portions of the same voice coil wire.

Since the two voice coil wires are wound at the same time in the same direction and the lead-out positions of the wire-in end and wire-out end of each voice coil wire are different, one of the voice coil wires may be wound more by half a turn or a certain length, in order to maintain the consistency of the two voice coil wires on the voice coil 7, the wire-in end and an adjacent wire-out end are respectively one of the end portions of two voice, coil wires. In other words, the first wire-in end 70 and the first wire-out end 71 are respectively the lead-out ends of two different voice coil wires, the first wire-in end 70 and the second wire-out end 73 are two end portions of the same voice coil wire, and the second wire-in end 72 and the first wire-out end 71 are two end portions of the same voice coil wire.

In the sound generating unit of the present invention, the connecting portion 50 at the edge of the diaphragm is fixed above the side magnetic circuit portion, and the projection of the diaphragm in its vibration direction is within the outer contour range of the magnetic circuit system. This structure is different from a traditional structure where the diaphragm is connected to the housing such that the projection of the diaphragm in its vibration direction is outside the outer contour range of the magnetic circuit system.

For example, the edge of the diaphragm may be fixed on the upper surface of the side concentrating flux plate 5. In order to prevent the corrugated rim 51 of the diaphragm from interfering with the side concentrating flux plate 5 when vibrating together with the vibrating portion 52, it is preferable that the edge of the side concentrating flux plate 5 is provided with a flange protruding upward, and the edge of the diaphragm may be fixed on the flange.

Optionally, the side concentrating lux plate 5 is provided with as washer 8 on the edge of the upper surface thereof, and the edge of the diaphragm is fixed on the washer 8. In order to prevent the corrugated rim 51 of the diaphragm from interfering with the washer 8 when vibrating together with the vibrating portion 52, the edge of the washer 8 is provided with a flange 80 protruding upward therefrom, and the edge of the diaphragm is fixed on the flange 80 to form an avoidance area at a position on the wash 8 corresponding to the corrugated rim 51, see FIG. 1.

Of course, other ways for fixing the diaphragm are also possible, and are not limited in the present invention.

The diaphragm may be located at the upper surface of the sound generating unit, the magnetic yoke 1 is located at the lower surface of the sound generating unit, and the sidewalls of the entire magnetic circuit system are exposed to outside. That is to say, no additional housing is provided for the sound generating unit to accommodate various elements therein. When the sound generating unit is used, it may be directly installed in a module housing to form a sound generating module. It is also possible to directly install the sound generating unit into a terminal housing to form an electronic terminal; or, the sound generating unit is installed in the terminal housing in a form of a sound generating module to form an electronic terminal, which will not be described in detail here.

Although some specific embodiments of the present invention have been described in detail through examples, those skilled in the art should understand that the above examples are only for illustration and not for limiting the scope of the present invention. It should be understood by a person skilled in the art that the above embodiments may be modified without departing from the scope and spirit of the present invention. The scope of the present invention is defined by the attached claims.

The invention claimed is:

1. A sound generating unit, comprising a magnetic circuit system, a vibration system, and a circuit board, wherein the magnetic circuit system comprises a magnetic yoke, a central magnetic circuit portion and a side magnetic circuit portion each arranged on the magnetic yoke; wherein at least one of the central magnetic circuit portion and the side magnetic circuit portion comprises a permanent magnet, and the central magnetic circuit portion and the side magnetic circuit portion form a magnetic gap therebetween; wherein the vibration system comprises a diaphragm and a voice coil connected with a first end thereof to the diaphragm and extending with a second end thereof into the magnetic gap of the magnetic circuit system;

wherein, the voice coil includes two voice coil wires wound together, and each voice coil wire having a wire-in end and a wire-out end; the voice coil having on a first side thereof lead-out positions of two wire-in ends, and on a second side thereof lead-out positions of two wire-out ends; the two wire-in ends and the two wire-out ends being respectively electrically connected to corresponding pads of the circuit board, and the circuit board having an internal circuit configured to electrically connect the two wire-in ends together and to electrically connect the two wire-out ends together;

the side magnetic circuit portion is formed with an accommodating groove at a side away from the magnetic gap, and the circuit board is of a hollow ring shape and is arranged in the accommodating groove.

2. The sound generating unit according to claim 1, wherein each of the wire-ins end is symmetrical to an adjacent wire-out end with respect to a first axis of the voice coil.

3. The sound generating unit according to claim 2, wherein the two wire-in ends are symmetrical with respect to a second axis of the voice coil, and the two wire-out ends are symmetrical with respect to the second axis of the voice coil, and the first axis of the voice coil is perpendicular to the second axis of the voice coil.

4. The sound generating unit according to claim 3, wherein each of the wire-in ends and an adjacent wire-out end are two end portions of the same voice coil wire.

5. The sound generating unit according to claim 4, wherein each of the wire-in ends and an adjacent wire-out end are respectively one end portion of the two voice coil wires.

6. The sound generating unit according to claim 1, wherein the side magnetic circuit portion forms respectively an opening at a position corresponding to the two wire-in ends and an opening at a position corresponding to the two wire-out ends, and the circuit board forms pads at positions respectively corresponding to the openings of the side magnetic circuit portion, and the two wire-in ends and the two wire-out ends pass through the respective openings and are welded on adjacent pads.

7. The sound generating unit according to claim 1, wherein the side magnetic circuit portion forms respectively an opening at a position corresponding to the two wire-in ends and an opening at a position corresponding to the two wire-out ends, and the circuit board forms pads at positions respectively corresponding to the openings of the side magnetic circuit portion, and the two wire-in ends and the two wire-out ends respectively pass through their respective corresponding openings, wind to an outside the corresponding side magnetic circuit portion, circuitously extend to the corresponding adjacent pad from the outside the corresponding side magnetic circuit portion, and are welded on the adjacent pads, and the two wire-in ends and the two wire-out ends are respectively welded on different pads.

8. The sound generating unit according to claim 7, wherein when the two wire-in ends pass through respective corresponding openings, at least one wire-in end and a corresponding side magnetic circuit portion therebetween have a distance gradually decreasing in a direction from being proximate to the magnetic gap to being close to outside the side magnetic circuit portion;

and/or, when the two wire-out ends pass through their respective corresponding openings, at least one wire-out end and a corresponding side magnetic circuit portion therebetween have a distance gradually decreasing in the direction from being close to the magnetic gap to being close to the outside the side magnetic circuit portion.

9. The sound generating unit according to claim 8, wherein the adjacent pad welded to each of the wire-in ends is a pad formed at the opening of a different of the wire-in ends; and the adjacent pad welded to each of the wire-out ends is a pad formed at the opening of the other wire-out end.

10. The sound generating unit according to claim 9, wherein the side magnetic circuit portion is formed with a carrying platform facing the magnetic yoke at outer side of a partial edge of the side magnetic circuit portion;

at least one of the two wire-in ends and the two wire-out ends has a first part fixed on the carrying platform; the first part is a part of the wire-in ends and the wire-out ends wound to the outside the corresponding side magnetic circuit portion.

11. The sound generating unit according to claim 10, wherein the side magnetic circuit portion comprises a side magnet and a side concentrating flux plate disposed on an upper surface of the side magnet;

the side magnet has an outer edge extending outward to form the carrying platform;

or, the side concentrating flux plate has an outer edge bent in a direction toward the magnetic yoke and extending to the outer side of the side magnet to form the carrying platform.

12. The sound generating unit according to claim 11, wherein the outer side of the partial edge of the side magnetic circuit portion is provided with a fixing member, and the fixing member comprises a first component facing the diaphragm and a second component facing the magnetic yoke, and the first component and the second component are facing each other with a clearance there between;

at least one of the two wire-in ends and the two wire-out ends, when being wound to the outside of the corresponding side magnetic circuit portion, is sandwiched in the clearance and passes through the clearance to be electrically connected to the corresponding adjacent pad.

13. The sound generating unit according to claim 1, wherein the side magnetic circuit portion comprises a side magnet and a side concentrating flux plate disposed on an upper surface of the side magnet;

the side concentrating flux plate is formed with a recessed portion at a side facing the side magnet, and the recessed portion is located on an edge at a side of the side concentrating flux plate away from the magnetic gap, and the recessed portion constitutes the accommodating groove;

or, the side magnet is formed with a recessed portion on a side facing the side concentrating flux plate, and the recessed portion is located on an edge at a side of the side magnet away from the magnetic gap, and the recessed portion constitutes the accommodating groove;

or, the side concentrating flux plate and the side magnet are formed with recessed portions at their sides facing each other, and the recessed portions are located on edges at the sides of the side concentrating flux plate and the side magnet away from the magnetic gap, and the recessed portions of the side concentrating flux plate and the side magnet together constitute the accommodating groove.

14. The sound generating unit according to claim 13, wherein the diaphragm is fixed above the side magnetic circuit portion with the edge thereof;

the diaphragm has a projection in its vibration direction which is located within an outer contour range of the magnetic circuit system.

15. The sound generating unit according to claim 14, wherein the side magnetic circuit portion comprises a side magnet and a side concentrating flux plate disposed on an upper surface of the side magnet, and the edge of the diaphragm is fixed on an upper surface of the side concentrating flux plate.

16. The sound generating unit according to claim 15, wherein the edge of the upper surface of the side concentrating flux plate is provided with a washer, and the edge of the diaphragm is fixed on the washer.

17. The sound generating unit according to claim 16, wherein a flange protrudes upward from the edge of the washer, and the edge of the diaphragm is fixed on the flange.

18. A sound generating module, comprising a module housing and the sound generating unit according to claim 1 installed in the module housing.

19. An electronic terminal, comprising a terminal housing, and the sound generating unit according to claim 1 installed in the terminal housing, or the sound generating module according to claim 18 installed in the terminal housing.

* * * * *